United States Patent
Spangler et al.

(10) Patent No.: US 10,648,351 B2
(45) Date of Patent: May 12, 2020

(54) GAS TURBINE ENGINE COOLING COMPONENT

(71) Applicant: United Technologies Corporation, Farmington, CT (US)

(72) Inventors: Brandon W. Spangler, Vernon, CT (US); Adam P. Generale, Dobbs Ferry, NY (US); Ky H. Vu, East Hartford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 176 days.

(21) Appl. No.: 15/832,948

(22) Filed: Dec. 6, 2017

(65) Prior Publication Data

US 2019/0170002 A1 Jun. 6, 2019

(51) Int. Cl.

| F01D 9/02 | (2006.01) |
|---|---|
| F01D 9/04 | (2006.01) |
| F02C 7/141 | (2006.01) |
| F02C 3/04 | (2006.01) |
| F01D 5/18 | (2006.01) |
| F01D 5/14 | (2006.01) |

(52) U.S. Cl.
CPC ............. *F01D 9/023* (2013.01); *F01D 5/147* (2013.01); *F01D 5/188* (2013.01); *F01D 9/041* (2013.01); *F02C 3/04* (2013.01); *F02C 7/141* (2013.01); *F05D 2240/81* (2013.01); *F05D 2260/201* (2013.01); *F05D 2260/202* (2013.01)

(58) Field of Classification Search
CPC ...... F01D 5/187; F01D 9/041; F05D 2240/81; F05D 2260/201
See application file for complete search history.

(56) References Cited

U.S. PATENT DOCUMENTS 3,628,880 A * 12/1971 Smuland ................. F01D 5/189
                                                            415/175
4,721,433 A    1/1988 Piendel et al.
6,142,730 A * 11/2000 Tomita .................... F01D 5/187
                                                            415/114

(Continued)

FOREIGN PATENT DOCUMENTS

EP    1489265    12/2004
EP    2949871    2/2015

(Continued)

OTHER PUBLICATIONS

The Extended European Search Report for EP Application No. 18210702.9, dated Feb. 26, 2019.

(Continued)

*Primary Examiner* — Ninh H. Nguyen
(74) *Attorney, Agent, or Firm* — Carlson, Gaskey & Olds, P.C.

(57) ABSTRACT

A component for a gas turbine engine includes a platform that has a gas path side and a non-gas path side. At least one airfoil extends from the gas path side of the platform. At least one airfoil includes an internal cavity that has an inlet on the non-gas path side of the platform. A cover plate is located adjacent the non-gas path side of the platform. The cover plate includes a first plurality of fluid openings that extend through the cover plate. At least one bulge is at least partially aligned with the inlet.

16 Claims, 7 Drawing Sheets

(56) References Cited

U.S. PATENT DOCUMENTS

| | | | | |
|---|---|---|---|---|
| 6,561,757 B2* | 5/2003 | Burdgick | ............... | F01D 5/186 |
| | | | | 415/114 |
| 8,292,573 B2* | 10/2012 | Broomer | ................ | F01D 9/041 |
| | | | | 415/178 |
| 8,702,375 B1* | 4/2014 | Liang | .................... | F01D 9/065 |
| | | | | 415/115 |
| 8,821,111 B2 | 9/2014 | Gear et al. | | |
| 8,827,632 B1* | 9/2014 | Lee | ........................ | F01D 5/188 |
| | | | | 415/115 |
| 8,870,524 B1 | 10/2014 | Liang | | |
| 2012/0148383 A1 | 6/2012 | Gear et al. | | |
| 2015/0159494 A1 | 6/2015 | Carrier et al. | | |
| 2016/0312632 A1 | 10/2016 | Hagan et al. | | |
| 2018/0045060 A1 | 2/2018 | Matsu et al. | | |

FOREIGN PATENT DOCUMENTS

| | | |
|---|---|---|
| EP | 2921650 | 9/2015 |
| EP | 3232002 | 10/2017 |
| EP | 3361054 | 8/2018 |
| JP | 2003083001 | 3/2003 |

OTHER PUBLICATIONS

The Extended European Search Report for EP Application No. 18210771.4 dated Feb. 26, 2019.

* cited by examiner

GAS TURBINE ENGINE COOLING COMPONENT

BACKGROUND

This disclosure relates generally to a gas turbine engine, and more particularly to a component that can be incorporated into a gas turbine engine. The component can include a cover plate for providing dedicated cooling to portions of the component.

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

Both the compressor and turbine sections of a gas turbine engine may include alternating rows of rotating blades and stationary vanes that extend into the core flow path of the gas turbine engine. For example, in the turbine section, turbine blades rotate and extract energy from the hot combustion gases that are communicated along the core flow path of the gas turbine engine. The turbine vanes prepare the airflow for the next set of blades. These blades and vanes are examples of components that may need cooled by a dedicated source of cooling air in order to withstand the relatively high temperatures of the hot combustion gases that are communicated along the core flow path of a gas turbine engine.

SUMMARY

In one exemplary embodiment, a component for a gas turbine engine includes a platform that has a gas path side and a non-gas path side. At least one airfoil extends from the gas path side of the platform. At least one airfoil includes an internal cavity that has an inlet on the non-gas path side of the platform. A cover plate is located adjacent the non-gas path side of the platform. The cover plate includes a first plurality of fluid openings that extend through the cover plate. At least one bulge is at least partially aligned with the inlet.

In a further embodiment of any of the above, a perimeter of the cover plate is attached to a land on the non-gas path side of the platform and the at least one bulge is spaced inward from a perimeter of the cover plate.

In a further embodiment of any of the above, the non-gas path side of the platform includes a feed cavity surrounding the inlet.

In a further embodiment of any of the above, the cover plate encloses the inlet.

In a further embodiment of any of the above, at least one airfoil includes a forward internal cavity located forward of the internal cavity and has an inlet spaced outward from a perimeter of the cover plate.

In a further embodiment of any of the above, the cover plate includes a pair of airfoils that each have a corresponding inlet on the non-gas path side of the platform. The cover plate includes a pair of bulges each aligned with a corresponding one of the inlets.

In a further embodiment of any of the above, the first plurality of fluid openings in the cover plate are located on a first circumferential side of the at least one bulge and a second plurality of fluid openings are located on a second circumferential side of the at least one bulge.

In a further embodiment of any of the above, the inlet is at least partially defined by a collar.

In a further embodiment of any of the above, the inlet includes a plurality of inlets and the collar at least partially surrounds each of the inlets.

In a further embodiment of any of the above, the cover plate is free of non-cooling apertures.

In a further embodiment of any of the above, the internal cavity feeds trailing edge cooling apertures on the at least one airfoil.

In another exemplary embodiment, a gas turbine engine includes a compressor section. A combustor section is in fluid communication with the compressor section. A turbine section is in fluid communication with the combustor section. One of the compressor section or the turbine section includes at least one component that has a platform that has a gas path side and a non-gas path side. At least one airfoil extends from the gas path side of the platform. At least one airfoil includes an internal cavity that has an inlet on the non-gas path side of the platform. A cover plate is located adjacent to the non-gas path side of the platform. The cover plate includes a first plurality of fluid openings that extend through the cover plate. At least one bulge is at least partially aligned with the inlet.

In a further embodiment of any of the above, a perimeter of the cover plate is attached to a land on the non-gas path side of the platform. At least one bulge is spaced inward from a perimeter of the cover plate.

In a further embodiment of any of the above, the non-gas path side of the platform includes a feed cavity surrounding the inlet.

In a further embodiment of any of the above, the cover plate encloses the inlet.

In a further embodiment of any of the above, at least one airfoil includes a forward internal cavity located forward of the internal cavity that has an inlet spaced outward from a perimeter of the cover plate.

In a further embodiment of any of the above, at least one airfoil includes a pair of airfoils that each have a corresponding inlet on the non-gas path side of the platform. The cover plate includes a pair of bulges each aligned with a corresponding one of the inlets.

In a further embodiment of any of the above, the first plurality of fluid openings in the cover plate are located on a first circumferential side of at least one bulge. A second plurality of fluid openings are located on a second circumferential side of the at least one bulge.

In a further embodiment of any of the above, the inlet is at least partially defined by a collar.

In a further embodiment of any of the above, the inlet includes a plurality of inlets and the collar at least partially surrounds each of the inlets.

DETAILED DESCRIPTION

Figure 1:
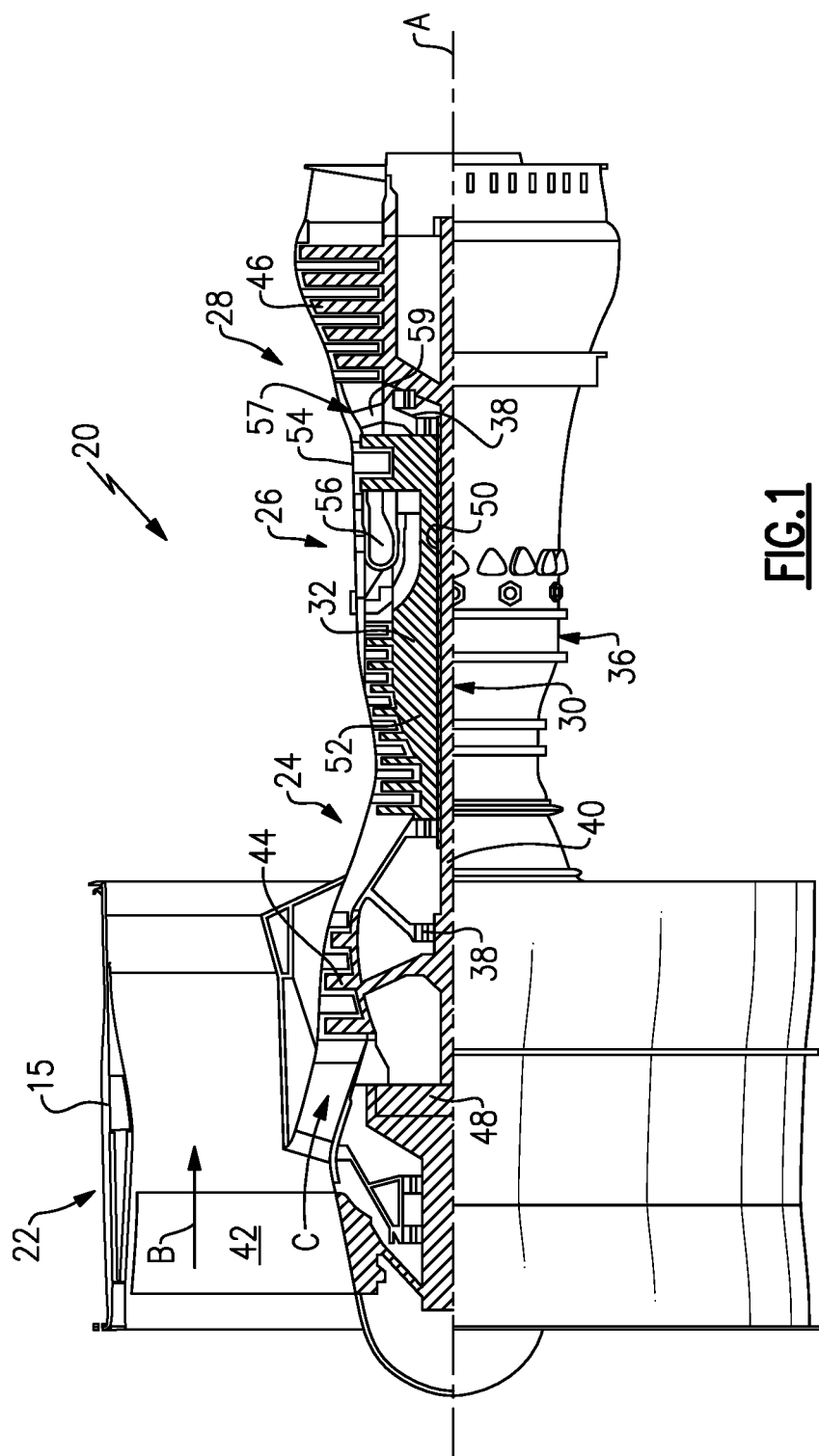
FIG. 1 is a schematic view of an example gas turbine engine according to a first non-limiting embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
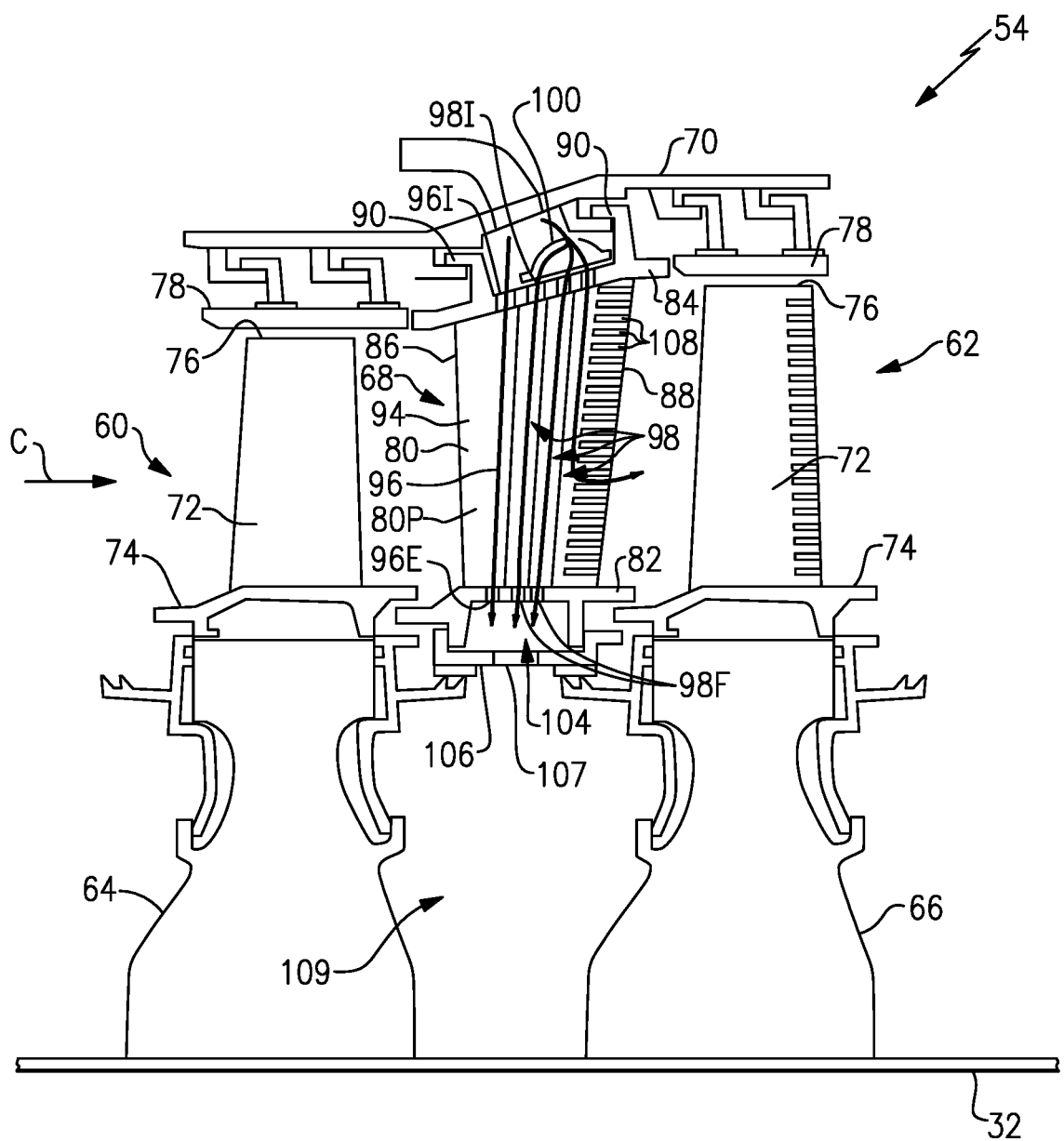
FIG. 2 is a schematic view of a section of the gas turbine engine of FIG. 1, such as a turbine section.

FIG. 2 illustrates a cross-sectional view through a high pressure turbine section 54. In the example high pressure turbine section 54, first and second arrays of rotating blades 60, 62 are axially spaced apart from one another around first and second rotor disks 64, 66, respectively. An array of vanes 68 are located axially between the first and second arrays of blades 60, 62. The first and second arrays of blades 60, 62 and the array of vanes 68 are spaced radially inward from a case structure 70. It should be understood that any number of stages may be used in the example high pressure turbine section 54. Moreover, the disclosed airfoils may be used in a compressor section or the turbine section.

Each blade in the first and second array of blades 60, 62 includes an airfoil 72 that extends from a platform 74 towards a free end at a blade tip 76. The blade tip 76 is located adjacent a blade outer air seal 78 that is supported by the case structure 70. The blade outer air seals 78 provide an outer boundary of the core flow path C and the platform 74 provides an inner boundary of the core flow path C. The first and second arrays of the blades 60, 62 are operatively connected to the high speed spool 32, for example.

The array of vanes 68 include individual vanes having airfoils 80 that extend between a radially inner platform 82 and a radially outer platform 84 that define the core flow path C. The airfoil 80 includes a pressure side 80P (predominantly concave—FIG. 2) and a suction side 80S (predominantly convex—FIG. 3) extending between a leading edge 86 and a trailing edge 88. The radially outer platform 84 includes hooks 90 that secure the array of vanes 68 relative to the case structure 70. It should be understood that the array of vanes 68 may be discrete from one another, arranged in integrated clusters of vanes, or a continuous ring of vanes.

Figure 3:
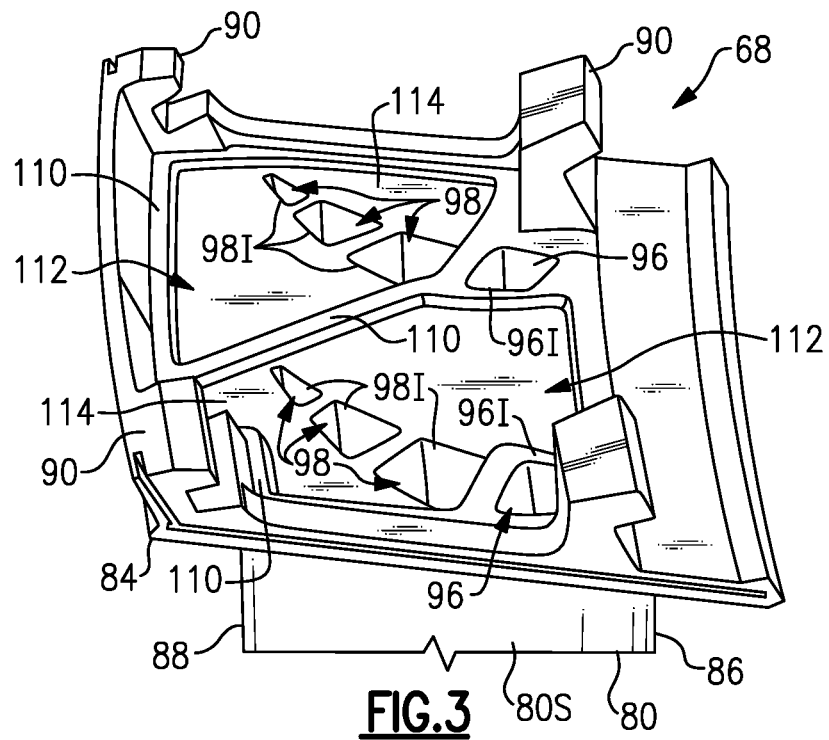
FIG. 3 is a perspective end view of an example vane.

Each airfoil 80 includes multiple internal cooling circuits or cavities. In the illustrated example, the airfoil 80 includes a leading edge cavity 94, an intermediate cavity 96, and downstream cavities 98. As shown in FIGS. 2 and 3, cooling air enters the intermediate cavity 96 through an intermediate cavity inlet 96I on a radially outer side of the radially outer platform 84 and travels in a radially inward direction through the airfoil 80 and exits through an intermediate cavity outlet 96E in a radially inner side of the radially inner platform 82. In this disclosure, radial or radially is in relation to the engine axis A unless stated or discussed otherwise.

Cooling air enters the downstream cavities 98 by traveling through fluid inlets 118 in a cover plate 100 (FIGS. 4-5) and through downstream cavity inlets 98I in the radially outer side of the radially outer platform 84. The cooling air travels radially inward through the airfoil 80 until it reaches a vane inner cavity 104. A portion of the cooling air entering the vane inner cavity 104 passes through an orifice 107 in an inner hoop seal 106 to provide cooling air to a rotor cavity 109. The cooling air in the downstream cavity 98 adjacent the trailing edge 88 exits the airfoil 80 through cooling apertures 108 (FIG. 2) extending along the trailing edge 88 of the airfoil 80.

In the illustrated example shown in FIG. 3, the array of vanes 68 are comprised of vane doublets having two airfoils 80. The radially outer platform 84 includes the two intermediate cavity inlets 96I to each of the intermediate cavities 96 in each of the airfoils 80 and six downstream cavity inlets 98I in fluid communication with a corresponding one of the downstream cavities 98.

A radially outer side or non-gas path side of the radially outer platform 84 includes a cover plate contact surface 110. In the illustrated example, the cover plate contact surface 110 is located on a radially outer surface of a rib that forms a weld land surrounding a recessed cavity 112. The cover plate contact surface 110 separates the inlet 98I to an upstream one of the downstream cavities 98 from the inlet 96I to intermediate cavity 96. In the illustrated example, each of the recessed cavities 112 are separated from each other by the rib defining cover plate contact surface 110.

In the illustrated example, the intermediate cavity inlet 96I is radially aligned with and at least partially defined by the cover plate contact surface 110. The downstream cavity inlets 98I are spaced radially inward from the intermediate cavity inlet 96I and at least partially defined by the base surface 114 of the recessed cavity 112.

Figure 4:
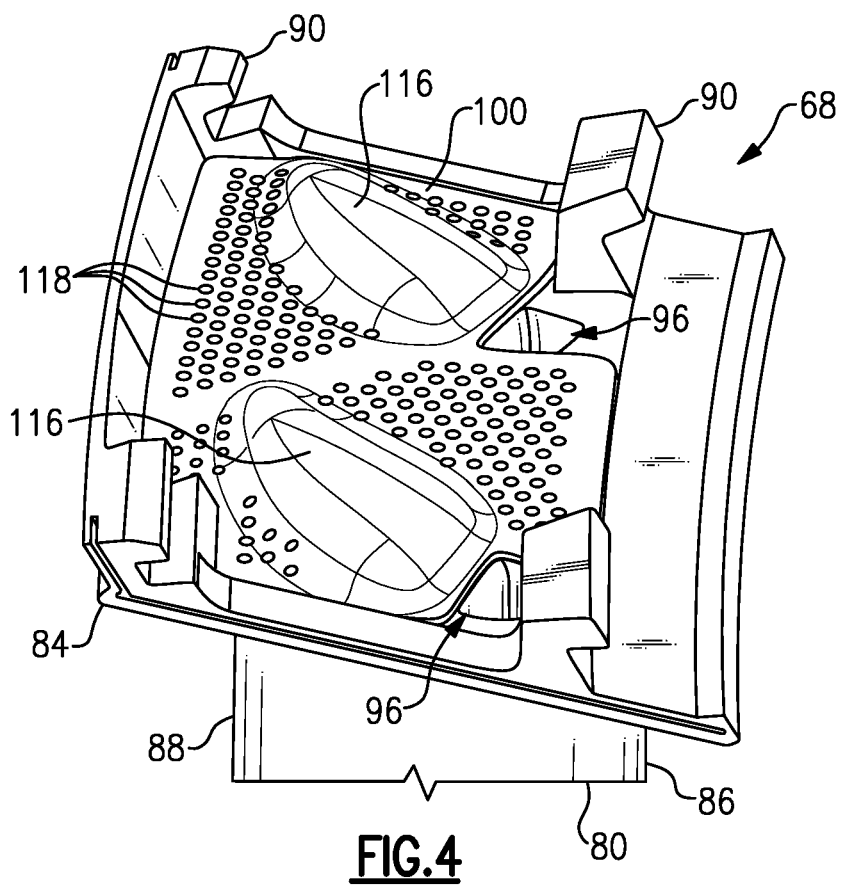
FIG. 4 is a perspective end view of the example vane of FIG. 3 with an example cover plate.
Figure 5:
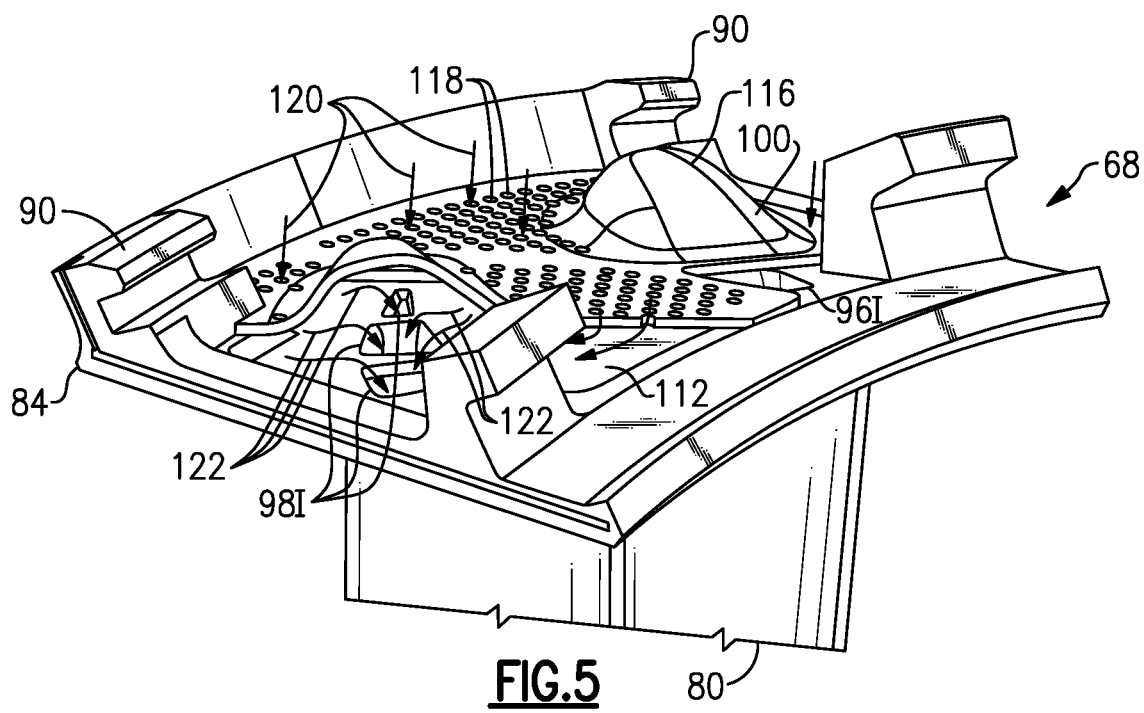
FIG. 5 is a perspective end view of the example vane of FIG. 3 with the example cover plate of FIG. 4 in cross section.

As shown in FIGS. 4-5, the cover plate 100 encloses the recessed cavity 112 to define a feed cavity for the downstream cavity inlets 98I. The cover plate 100 includes a radially outer side 100A and a radially inner side 100B. The radially inner side 100B is attached to cover plate contact surface 110 by welding, adhesive, or other means known in the art. The cover plate 100 is generally planar and includes bulges 116 circumferentially and axially aligned with the downstream cavity inlets 98I and spaced radially outward from the downstream cavity inlets 98I to define a fluid passageway there between.

As shown in FIG. 5, the cover plate 100 includes multiple fluid inlets 118 extending through the cover plate 100 to allow the cooling airflow to pass through the cover plate 100 as shown by arrows 120. In the illustrated example, the bulges 116 do not include the fluid inlets 118 and in another example, the bulges 116 includes some of the fluid inlets 118. Once the cooling air has passed through the fluid inlets 118 in the cover plate 100, the cooling air collects in the recessed cavity 112.

From the recessed cavity 112, the cooling air enters the downstream cavity inlets 98I. The cooling air enters from at least three sides of the downstream cavity inlets 98I as shown by arrows 122 in FIG. 5, resulting in lower Mach numbers and pressure loss entering the downstream cavity inlet 98I.

Figure 6:
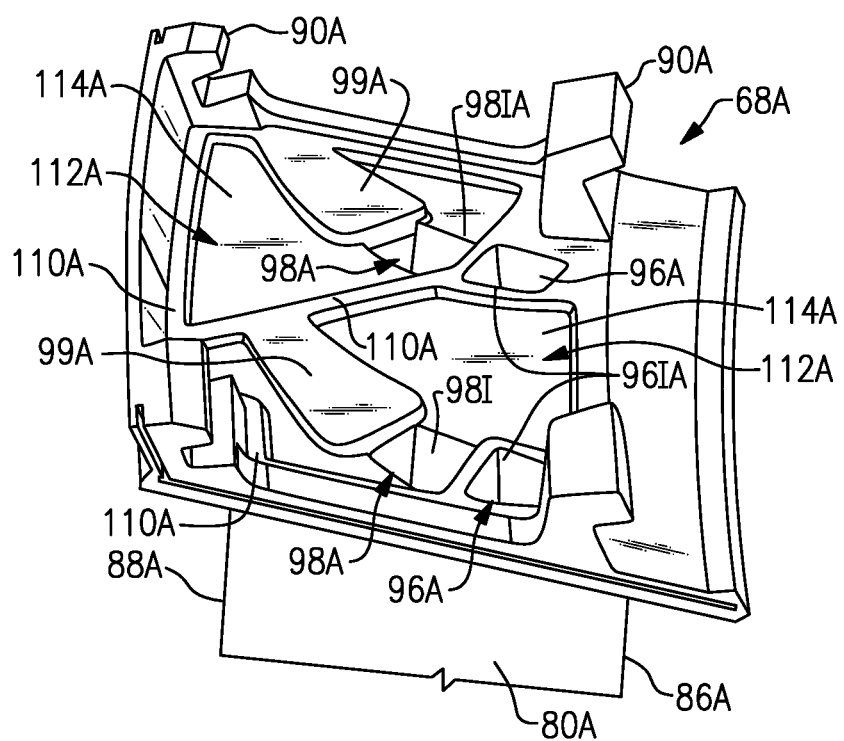
FIG. 6 is a perspective end view of another example vane.
Figure 7:
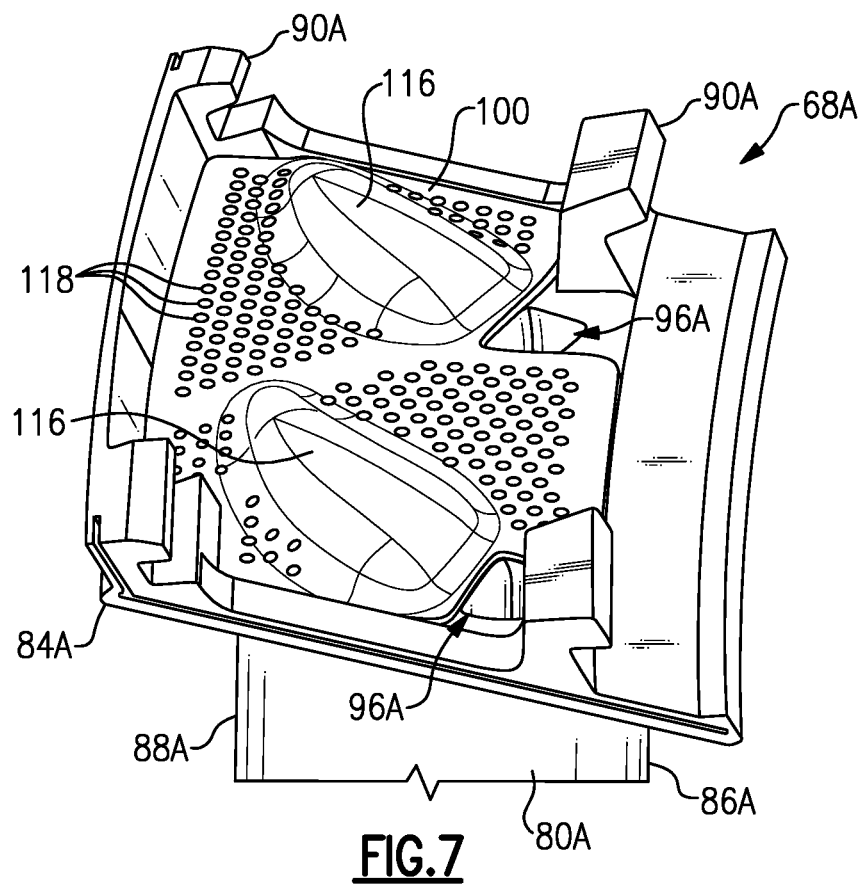
FIG. 7 is a perspective end view of the example vane of FIG. 6 with the example cover plate of FIG. 4.
Figure 8:
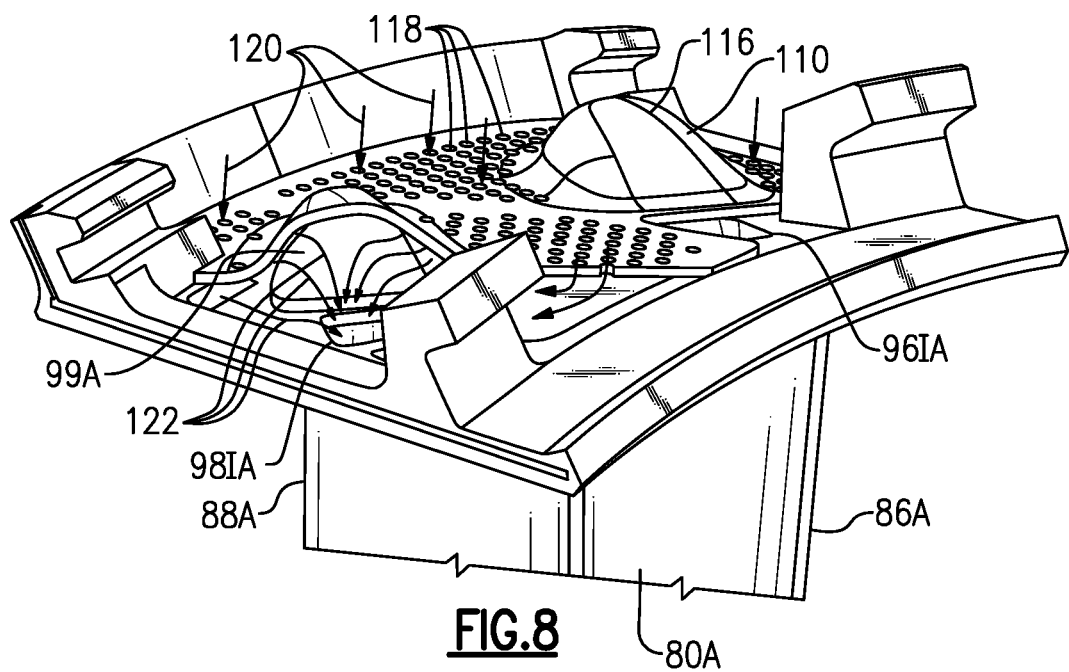
FIG. 8 is a perspective end view of the example vane of FIG. 6 with the example cover plate of FIG. 4 in cross section.

FIG. 6-8 illustrate another example vane 68A. The vane 68A is similar to the vane 68 except where shown in the Figures or described below. Like numbers will be used between the vane 68 and 68A but with the addition of an "A."

In the illustrated example, each airfoil 80A includes a leading edge cavity 94A (not shown), an intermediate cavity 96A, and a downstream cavity 98A. As shown in FIG. 7-8, cooling air enters the intermediate cavity 96A through an intermediate cavity inlet 96IA on a radially outer side of the radially outer platform 84A and travels in a radially inward direction through the airfoil 80A. The cooling air travels radially inward through the airfoil 80A until it reaches the vane inner cavity 104 (FIG. 2). A portion of the cooling air entering the vane inner cavity 104 can pass through the orifice 107 in an inner hoop seal 106 to provide cooling air to the rotor cavity 109.

Cooling air enters the downstream cavity 98A by traveling through the fluid inlets 118A in the cover plate 100 (FIGS. 7-8) and through downstream cavity inlet 98IA in the radially outer side of the radially outer platform 84A. The cooling air travels radially inward and outward through the airfoil 80A until it reaches the vane inner cavity 104A. A collar 99A on the radially outer side of the radially outer platform 84A partially encloses the downstream cavity 98A. A portion of the cooling air entering the vane inner cavity 104 can pass through the orifice 107 in an inner hoop seal 106 to provide cooling air to the rotor cavity 109.

The radially outer side or non-gas path side of the radially outer platform 84A includes a cover plate contact surface 110A. In the illustrated example, the cover plate contact surface 110A is located on a radially outer surface of a rib that forms a weld land surrounding a recessed cavity 112A. The cover plate contact surface 110A separates the inlet 98IA of the downstream cavity 98A from the inlet 96IA to intermediate cavity 96A. In the illustrated example, each of the recessed cavities 112A are separated from each other by the rib defining cover plate contact surface 110A and the collars 99A extend into a corresponding one of the recessed cavities 112A.

As shown in FIGS. 7-8, the cover plate 100 encloses the recessed cavity 112A to define a feed cavity for the downstream cavity inlet 98IA. The radially inner side 100B is attached to cover plate contact surface 110 by welding, adhesive, or other means known in the art. The bulges 116 on the cover plate 100 are circumferentially and axially aligned with the downstream cavity inlets 98IA and the collars 99 and spaced radially outward from the downstream cavity inlet 98I and the collars 99A to define a passageway there between.

As shown in FIG. 8, once the cooling air passes through the fluid inlets 118 in the cover plate 100, the cooling air collects in the passageway between the cover plate 100 and the recessed cavity 112A. From the passageway, the cooling air enters the downstream cavity inlet 98IA. The cooling air can enter from at least three sides of the downstream cavity inlet 98IA as shown by arrows 122 in FIG. 8, resulting in lower Mach numbers and pressure loss entering the downstream cavity inlet 98IA.

Figure 9:
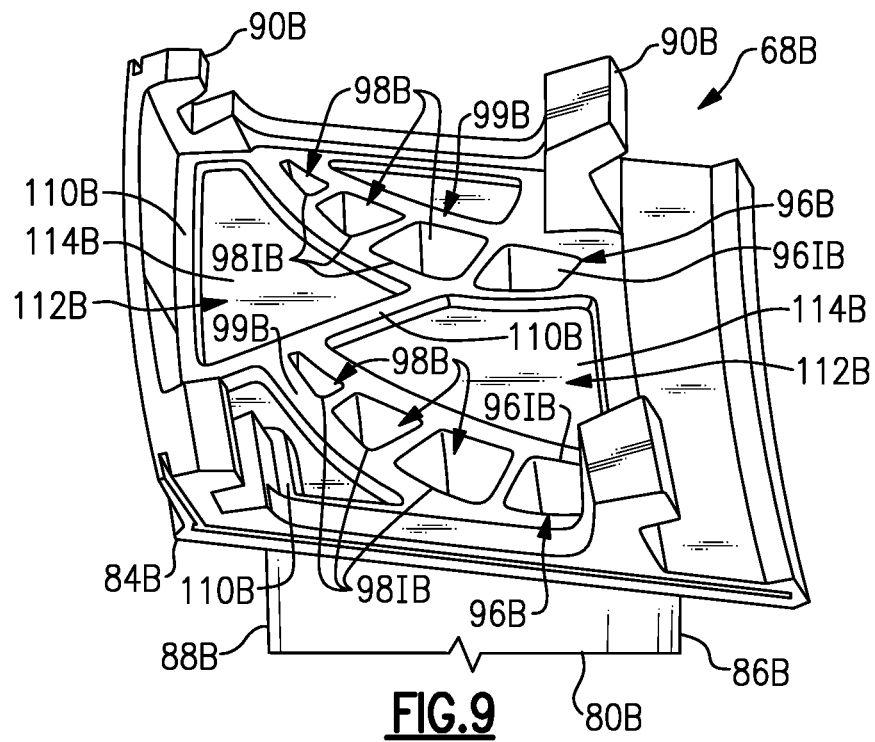
FIG. 9 is a perspective end view of yet another example vane.
Figure 10:
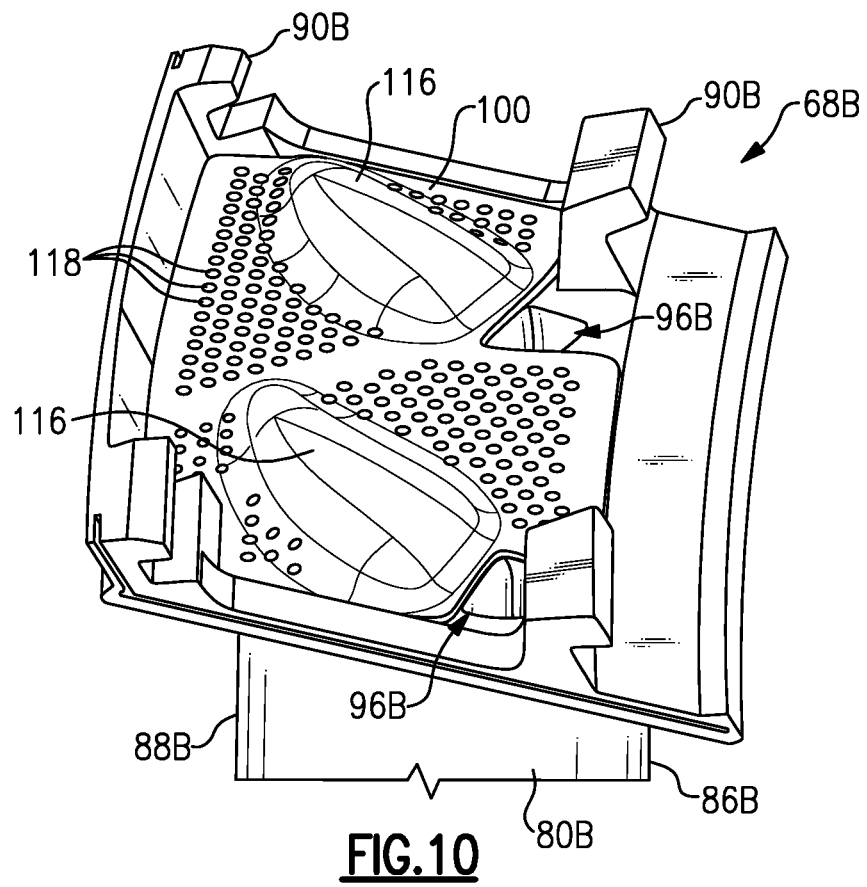
FIG. 10 is a perspective end view of the example vane of FIG. 9 with the example cover plate of FIG. 4.
Figure 11:
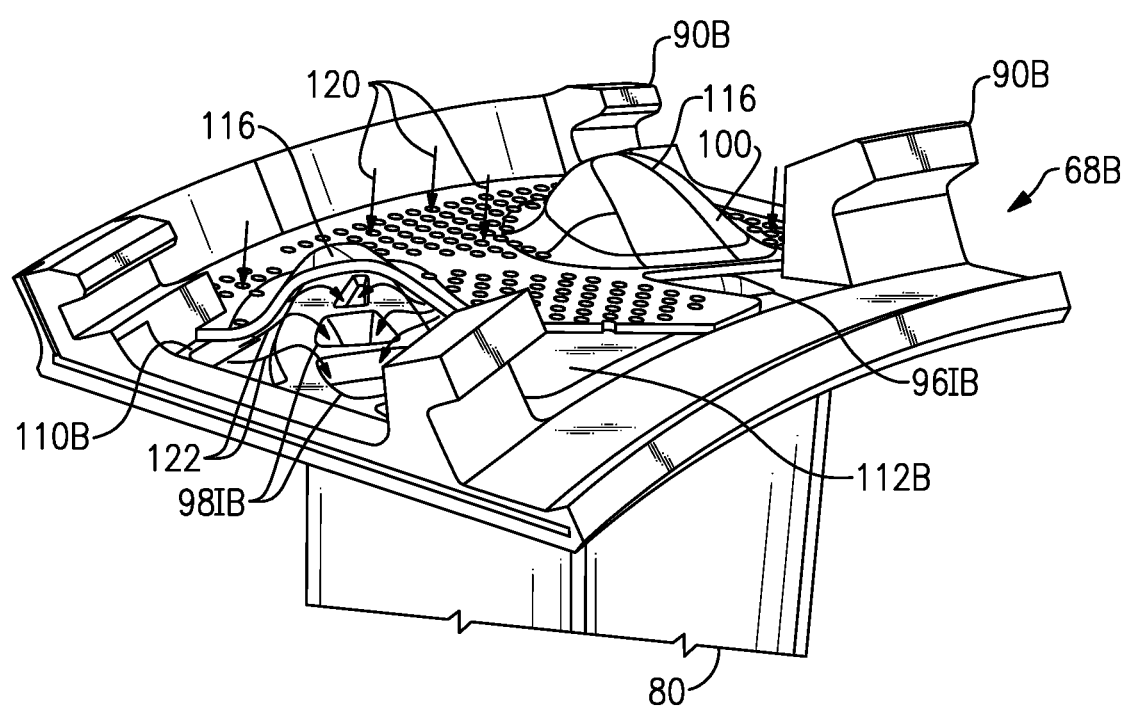
FIG. 11 is a perspective end view of the example vane of FIG. 9 with the example cover plate of FIG. 4 in cross section.

FIG. 9-11 illustrate another example vane 68B. The vane 68B is similar to the vane 68 except where shown in the Figures or described below. Like numbers will be used between the vane 68 and 68A but with the addition of a "B."

In the illustrated example, each airfoil 80B includes a leading edge cavity 94B (not shown), an intermediate cavity 96B, and downstream cavities 98B. As shown in FIG. 10-11, cooling air enters the intermediate cavities 96B through intermediate cavity inlets 96IB on a radially outer side of a radially outer platform 84B and travels in a radially inward direction through the airfoil 80B. The cooling air travels radially inward through the airfoil 80B until it reaches a vane inner cavity 104 (FIG. 2). A portion of the cooling air entering the vane inner cavity 104 can pass through the orifice 107 in the inner hoop seal 106 to provide cooling air to the rotor cavity 109 (FIG. 2).

Cooling air enters the downstream cavities 98B by traveling through fluid inlets 118B in the cover plate 100 (FIGS. 9-10) and through downstream cavity inlets 98IB in the radially outer side of the radially outer platform 84B. The cooling air travels radially inward and outward through the airfoil 80B until it reaches the vane inner cavity 104B. A collar 99B surrounds each of the downstream cavity inlets 98IB to reduce stress caused by the intersection of the airfoil 80B and the platform 84B. A portion of the cooling air entering the vane inner cavity 104 can pass through the orifice 107 in an inner hoop seal 106 to provide cooling air to the rotor cavity 109.

The radially outer side or non-gas path side of the radially outer platform 84B includes a cover plate contact surface 110B. In the illustrated example, the cover plate contact surface 110B is located on a radially outer surface of a rib that forms a weld land surrounding a recessed cavity 112B. The cover plate contact surface 110B separates the inlet 98IB of the downstream cavity 98B from the inlet 96IB to intermediate cavity 96B. In the illustrated example, each of the recessed cavities 112B are separated from each other by the rib defining cover plate contact surface 110B and a radially outer surface of each of the collars 99B is aligned with the cover plate contact surface 110B. However, in the illustrated embodiment, the cover plate 100 is not attached to the radially outer surface of the collars 99B.

As shown in FIGS. 10-11, the cover plate 100 encloses the recessed cavity 112B to define a feed cavity for the downstream cavity inlets 98IB. The radially inner side 100B is attached to cover plate contact surface 110 by welding, adhesive, or other means known in the art. The bulges 116 on the cover plate 100 are circumferentially and axially aligned with the downstream cavity inlets 98IB and the collars 99B and spaced radially outward from the downstream cavity inlets 98IB and the collars 99B to define a passageway there between.

As shown in FIG. 11, once the cooling air passes through the fluid inlets 118 in the cover plate 100, the cooling air collects in the passageway between the cover plate 100 and the recessed cavity 112B. From the passageway, the cooling air enters the downstream cavity inlets 98IB. The cooling air can enter from at least three sides of the downstream cavity inlets 98IB as shown by arrows 122 in FIG. 11, resulting in lower Mach numbers and pressure loss entering the downstream cavity inlets 98IB.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claim should be studied to determine the true scope and content of this disclosure.

What is claimed is:

1. A component for a gas turbine engine comprising:
   a platform having a gas path side and a non-gas path side;
   at least one airfoil extending from the gas path side of the platform, wherein the at least one airfoil includes an internal cavity having an inlet on the non-gas path side of the platform, wherein the internal cavity feeds trailing edge cooling apertures on the at least one airfoil; and
   a cover plate located adjacent the non-gas path side of the platform, the cover plate including:
   a first plurality of fluid openings extending through the cover plate; and
   at least one bulge at least partially aligned with the inlet.

2. The component of claim 1, wherein a perimeter of the cover plate is attached to a land on the non-gas path side of the platform and the at least one bulge is spaced inward from a perimeter of the cover plate.

3. The component of claim 1, wherein the at least one airfoil includes a forward internal cavity located forward of the internal cavity having an inlet spaced outward from a perimeter of the cover plate.

4. The component of claim 1, wherein the inlet is at least partially defined by a collar and the first plurality of fluid openings are in fluid communication with the inlet.

5. The component of claim 4, wherein the inlet includes a plurality of inlets and the collar at least partially surrounds each of the inlets.

6. The component of claim 1, wherein the cover plate is free of non-cooling apertures and the first plurality of fluid openings at least partially extend through the at least one bulge.

7. A component for a gas turbine engine comprising:
   a platform having a gas path side and a non-gas path side;
   a pair of airfoil extending from the gas path side of the platform, wherein each of the pair of airfoils includes an internal cavity having an inlet on the non-gas path side of the platform; and
   a cover plate located adjacent the non-gas path side of the platform, the cover plate including:

a first plurality of fluid openings extending through the cover plate; and
at least one bulge at least partially aligned with the inlet, wherein the cover plate includes a pair of bulges each aligned with a corresponding one of the inlets.

8. The component of claim 7, wherein the first plurality of fluid openings in the cover plate are located on a first circumferential side of the at least one bulge and a second plurality of fluid openings are located on a second circumferential side of the at least one bulge.

9. A gas turbine engine, comprising:
a compressor section;
a combustor section in fluid communication with said compressor section;
a turbine section in fluid communication with said combustor section;
wherein one of the compressor section or the turbine section includes at least one component having:
a platform having a gas path side and a non-gas path side;
at least one airfoil extending from the gas path side of the platform, wherein the at least one airfoil includes an internal cavity having an inlet on the non-gas path side of the platform, wherein the inlet is at least partially defined by a collar; and
a cover plate located adjacent the non-gas path side of the platform, the cover plate including:
a first plurality of fluid openings extending through the cover plate and in fluid communication with the inlet; and
at least one bulge at least partially aligned with the inlet.

10. The gas turbine engine of claim 9, wherein a perimeter of the cover plate is attached to a land on the non-gas path side of the platform and the at least one bulge is spaced inward from a perimeter of the cover plate and the first plurality of fluid openings at least partially extend through the at least one bulge.

11. The gas turbine engine of claim 9, wherein the non-gas path side of the platform includes a feed cavity surrounding the inlet and the feed cavity is at least partially defined by the platform and the cover plate.

12. The gas turbine engine of claim 11, wherein the cover plate encloses the inlet and the inlet is fluidly upstream of the internal cavity and fluidly downstream of the first plurality of fluid openings.

13. The gas turbine engine of claim 12, wherein the at least one airfoil includes a forward internal cavity located forward of the internal cavity having an inlet spaced outward from a perimeter of the cover plate.

14. The gas turbine engine of claim 9, wherein the at least one airfoil includes a pair of airfoils each having a corresponding inlet on the non-gas path side of the platform and the cover plate includes a pair of bulges each aligned with a corresponding one of the inlets.

15. The gas turbine engine of claim 14, wherein the first plurality of fluid openings in the cover plate are located on a first circumferential side of the at least one bulge and a second plurality of fluid openings are located on a second circumferential side of the at least one bulge.

16. The gas turbine engine of claim 9, wherein the inlet includes a plurality of inlets and the collar at least partially surrounds each of the inlets.

* * * * *